United States Patent [19]
Bakhir et al.

[11] Patent Number: 5,871,623
[45] Date of Patent: Feb. 16, 1999

[54] APPARATUS FOR ELECTROCHEMICAL TREATMENT OF WATER AND/OR WATER SOLUTIONS

[75] Inventors: Vitold M. Bakhir; Jury G. Zadorozhny; Taras Barabash, all of Moscow, Russian Federation

[73] Assignee: Rscecat, USA, Inc., Las Vegas, Nev.

[21] Appl. No.: 820,259

[22] Filed: Mar. 18, 1997

Related U.S. Application Data

[63] Continuation of Ser. No. 624,720, Mar. 28, 1996, Pat. No. 5,628,888.

[30] Foreign Application Priority Data

May 31, 1995 [RU] Russian Federation ............. 95109074

[51] Int. Cl.$^6$ ........................................................ C25B 9/00
[52] U.S. Cl. ........................... 204/260; 204/295; 204/263
[58] Field of Search ................................... 204/260, 295, 204/263

[56] References Cited

U.S. PATENT DOCUMENTS

| | | | |
|---|---|---|---|
| 3,812,026 | 5/1974 | Bertrand et al. | 204/260 X |
| 3,827,964 | 8/1974 | Okubo et al. | 204/260 X |
| 4,676,882 | 6/1987 | Okazaki et al. | 204/260 |
| 4,867,856 | 9/1989 | Okazaki | 204/260 X |
| 5,628,888 | 5/1997 | Bakhir et al. | 204/260 |
| 5,635,040 | 6/1997 | Bakhir et al. | 204/260 |

Primary Examiner—Donald R. Valentine
Attorney, Agent, or Firm—John Edward Roethel

[57] ABSTRACT

An apparatus for electrochemical purification of water and for regulation of acid-alkaline properties, Red-Ox characteristics and catalytic activity of water that can be used for obtaining washing and disinfecting solutions. The apparatus includes at least one electrochemical cell which contain vertical coaxial cylindrical and rod electrodes made from material nonsoluble during electrolysis and an ultrafiltration ceramic diaphragm installed in the bushings between the electrodes to create inter-electrode space in the electrode chambers. The lower and upper bushings have a channels for the treated solution supply into and discharge from the electrode chambers. The channels are connected to the feeding and discharging adjustment lines. There is also a metering pump on the water line for sodium chloride dosing into the water to be treated. The water line contains a flow regulator connected to the feeding and discharging adjustment lines. Poles of the power supply are connected to the electrodes. The feeding line is connected to the inlet of the negative electrode chamber and the output of the negative electrode chamber is connected to the inlet of the positive electrode chamber by a special line which has an adjustment for discharging a part of the degasified treated solution from the chamber of the negative electrode. A catalyst chamber can be installed on the special line. The catalyst chamber contains a mixture of particles of carbon and manganese dioxide. A separator with a tangential inlet is used for discharging a part of the degasified processed solution.

1 Claim, 4 Drawing Sheets

APPARATUS FOR ELECTROCHEMICAL TREATMENT OF WATER AND/OR WATER SOLUTIONS

This is a continuation of application Ser. No. 08/624,720, filed Mar. 28, 1996, now U.S. Pat. No. 5,628,888.

This invention relates to the area of chemical technology, and more particularly to apparatus for the electrochemical treatment and purification of water and/or water solutions and for the regulation of acid-alkaline properties, Red-Ox characteristics and catalytic activity of water and can be used for obtaining washing/disinfecting solutions.

BACKGROUND OF THE INVENTION

In the area of applied electrochemistry, different design electrolyzers have been used for water treatment or for obtaining washing and disinfecting solutions.

A device with flat perforated electrodes pressed against the diaphragm is used for water treatment in the anode chamber and cathode chamber separately. See the Author's Certificate USSR No. 882944 (1978). One of the disadvantages of such a device is the poor hydrodynamics. Another disadvantage is that the resulting products from the anode electrochemical reaction and the cathode electrochemical reaction can become mixed together because the diaphragm has a high penetrability. Also such an electrolyzer containing flat electrodes requires excessive manual labor in order to be assembled and repaired.

Another device for the electrolysis of water consists of a cylindrical electrolyzer with coaxial electrodes which are fixed in dielectric bushings and a diaphragm is placed between the electrodes. The diaphragm separates the inter-electrode space in the cathode and anode chambers. See Japanese Published Patent Application No. 1-104387 (1989). Each chamber has a separate inlet in the lower bushing and a separate outlet in the upper bushing of the electrolyzer which are connected to the pressurized water line. The device includes a power supply connected to the electrodes through the switchboard for changing the polarity of electrodes, for descaling of the cathode electrode and for switching the hydraulic lines which provide the solution output from the anode chamber and the cathode chamber without mixing of the resulting solutions. It is possible to obtain electrochemical processed water with biocide characteristics by using this device.

The disadvantage of this device is the high energy consumption required for water treatment, in particular for the treatment of water which is changing its mineralization during the treatment. The broader the range of mineralization change attempted, the more powerful must be the power supply.

The device that is closest by the technical design and achieved result to the present invention is the apparatus for electrochemical treatment of water discloses in U.S. Pat. No. 5,427,667 (Bakhir et al.), which is a prototype from which the present invention evolved. The device disclosed in this application contains at least one electrochemical cell. The cell contains vertical coaxial cylindrical and rod electrodes and a diaphragm, each of which are made from material which is nonsoluble during electrolysis. The electrodes-are installed in dielectric bushings. An ultrafiltration ceramic diaphragm, the main ingredient of which is zirconium oxide, is installed in the bushings between the electrodes. The ability to change the geometric dimensions of the cell is limited by the formula.

The cells are fastened in the lower and upper collectors which are made from dielectric material. The collectors have channels for incoming and outgoing solutions. The cells are installed in the collectors in parallel hydraulically and in parallel or in series - parallel electrically.

The electrodes of the cell are connected with the poles of the power supply in such a way that the cylindrical electrode is an anode and the rod electrode is a cathode. Both electrode chambers are connected with the incoming water in a parallel manner and the cell has flow regulators on both lines. The device also has a water-jet pump for dosing a reagent entered from the tank installed on the water supplying line. The device may include a catalytic chamber. The power supply connected to the electrodes through the switchboard. The anode treated solution is a disinfectant and the cathode treated solution is a washing solution. The disadvantages in using this device for water treatment are that it requires relatively high power consumption and a large number of reagents to clean the cells.

The object of the present invention is to provide an improved apparatus for electrochemical treatment of water that reduces power consumption and extends the functional abilities of the earlier devices. This is achieved by varying the parameters of anolyte and catholyte, in particular by increasing the biocide characteristics of anolyte and reducing its corrosion activity.

This object can be achieved when the device for obtaining washing and disinfecting solutions by the electrolysis of sodium chloride water solution contains at least one electrochemical cell. The cell contains vertical coaxial cylindrical and rod electrodes made from material that is nonsoluble during electrolysis, and a coaxial ceramic ultrafiltration diaphragm. The cylindrical and rod electrodes are installed in the dielectric bushings. The ceramic ultrafiltration diaphragm is installed in the bushings between the electrodes. The diaphragm separates the inter-electrode space into two chambers.

Lower and upper bushings have channels for the treated solution that is supplied into and is discharged from the electrode chambers. The device also contains a metering pump for introducing sodium chloride to the treated water. The water line has a flow regulator which is connected to the metering pump. The poles of the power supply are connected to the electrodes. The feeding line is connected to the inlet of the negative electrode chamber. The outlet of the negative electrode chamber is connected to the inlet of the positive electrode chamber by a special line which has an adjustment for discharging part of the degasified processed solution from the chamber of the negative electrode. In addition, a chamber with catalyst can be installed on the special line. The catalytic chamber may contain a mixture of carbon and manganese oxide and has an inlet in the upper part and an outlet in the lower part. The adjustment for discharging part of the degasified processed solution is executed, for instance, as a separator with the tangential inlet containing a valve which permits the discharge of part of the flow and, after degasification, sends it to the end user. The adjustments for supplying and discharging the treated solution are made as collectors which permits the joining of two or more cells.

It is a known method when the treated solution is consequently passed first through the cathode chamber and then through the anode chamber. See, for instance, Inventor's Certificate USSR No. 865829 (1980). The order of water flowing through the electrode chambers is defined by the requirements for the purification rate from the ions of heavy metals. The regulation of the processes, which are ongoing in the electrode chambers, is aimed of changing the pH of the treated solution. These changes are significant in comparison with the initial solution. In particular, the pH of the solution treated in the cathode chamber is changed so that the treated solution produces a high alkaline reaction which exceeds the pH value for the hydrate formation. In order to obtain a neutral pH, after the filtration of the nonsoluble hydroxides, the acidification of the cathode treated water in the anode chamber is required.

With the new device of the present invention, it is essential that the cathode treated solution together with hydrogen flows through the anode chamber. Regulation of the pH is not so important due to the small value pH changes achieved. The main results from the process are the reduction-oxidizing (Red-Ox) reactions taking place on the surfaces of electrodes and in the volume of the solution. Red-Ox reactions permit the producing of washing and disinfecting solutions with the required characteristics.

DETAILED DESCRIPTION OF THE PREFERRED EMBODIMENTS

The present invention is an improvement on the prototype apparatus for electrochemical treatment of water disclosed in U.S. Pat. No. 5,427,667, the disclosure of which is incorporated herein by this reference thereto.

Figure 1:
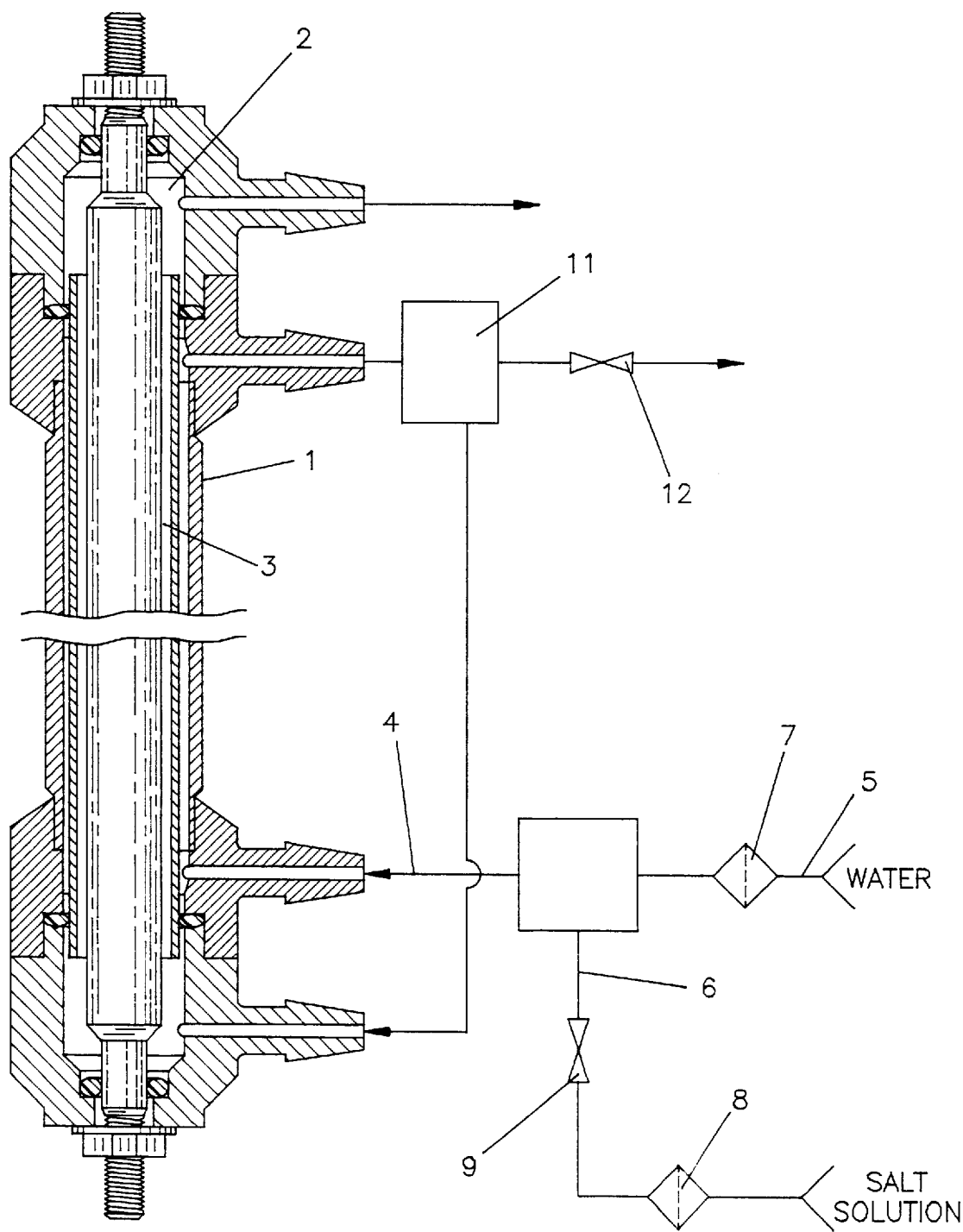
FIG. 1 shows one of the preferred embodiments of the present invention for the electrochemical synthesis of washing and disinfecting solutions in which the negative chamber outlet is connected with the positive chamber inlet by the special line.
Figure 2:
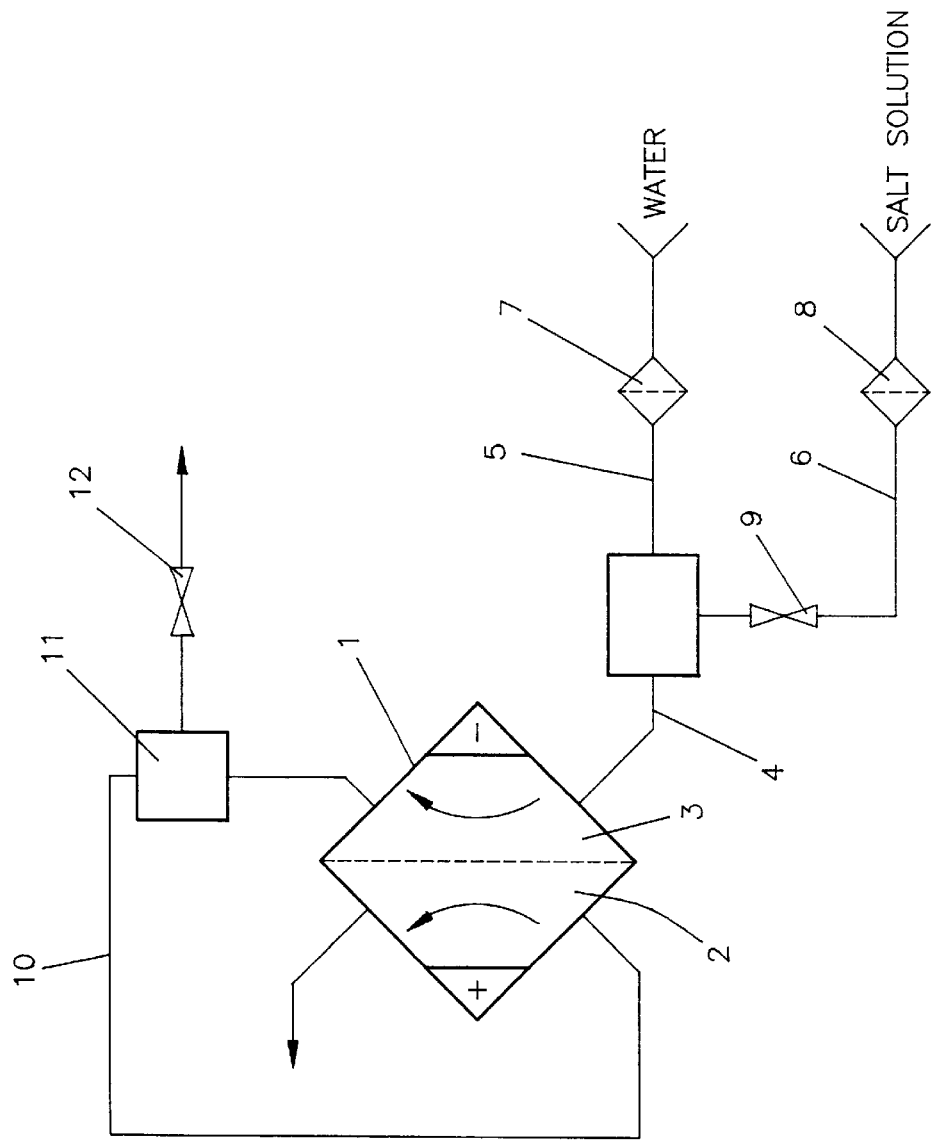
FIG. 2 shows schematically the preferred embodiment of the present invention of FIG. 1.

The apparatus of the present invention for obtaining washing and disinfecting solutions is shown in FIGS. 1 and 2 and contains an electrochemical cell 1. The electrochemical cell is described in connection with the prototype in U.S. Pat. No. 5,427,667. The vertical coaxial electrodes (anode and cathode) of the cell are connected to the poles of the power supply (not shown). The ceramic diaphragm is made from zirconium oxide, aluminum oxide and yttrium oxide, is installed between the electrodes and separates the interelectrode space, in the electrode chambers: the anode chamber 2 and the cathode chamber 3. The cathode chamber 3 is connected to the feeding line 4 containing the solution to be treated. This line also contains the running water line 5 and the brine line 6. The running water line 5 contains a filter 7 and the brine line 6 contains a filter 8 to remove impurities. The brine line 6 contains the valve 9. The negative electrode chamber outlet 3 is connected to the inlet of the positive electrode chamber 2 by the special line 10. The special line 10 contains an adjustment 11. The adjustment 11 permits the discharge of part of the degasified treated solution from the negative electrode chamber 3. The adjustment 11 can be made, for example, as a separator with the tangential inlet containing a valve type device 12 for discharging part of the treated solution and, after degasification, delivering it to the user.

Figure 3:
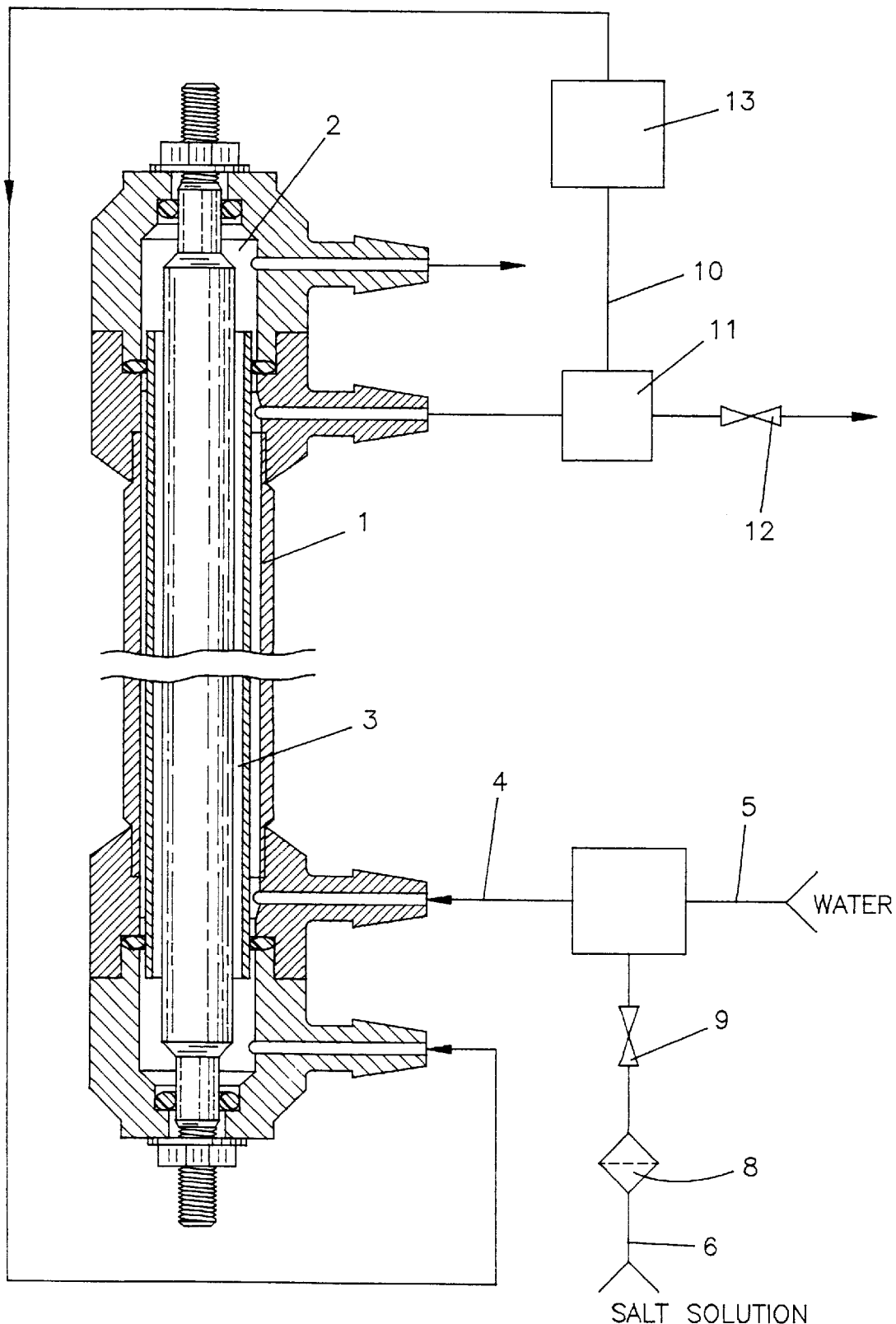
FIG. 3 shows another preferred embodiment of the present invention for the electrochemical synthesis of washing and disinfecting solutions in which a catalyst chamber is provided on the special line.
Figure 4:
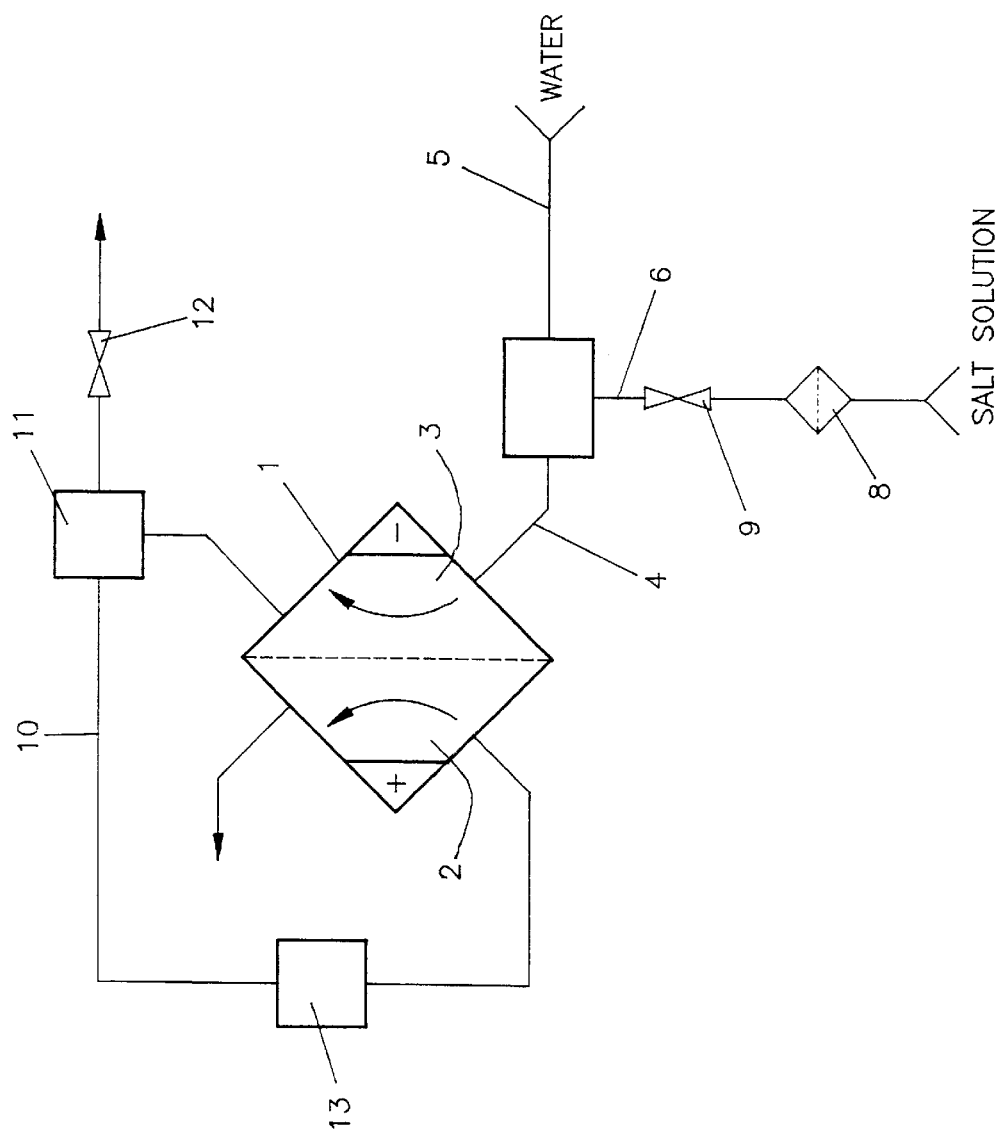
FIG. 4 shows schematically the preferred embodiment of the present invention of FIG. 3.

As shown in FIGS. 3 and 4, the special line 10 may also have a chamber 13 containing the catalyst. The chamber 13 can contain, for instance, a mixture of particles of carbon and manganese dioxide. The catalyst allows one to control changes in the anolyte properties (reducing its corrosion activity) by regulation of the content of active ingredients in the catholyte.

The apparatus of the present invention works as follows. Source solution runs in line 4 and contains water filtered 7 from the impurities line 5 and a solution of sodium chloride carried in line 6. The water and sodium chloride proportions in the source solution can be adjusted by the valve 9. The source solution enters into the cathode chamber 3 of the electrochemical cell 1. The amount of sodium chloride in the water depends upon the application. When the power supply is on, the position of the valve 12 affects how the process is run.

If the valve 12 is closed, the entire volume of the catholyte, together with the hydrogen, which was produced during electrolysis, enters into the anode chamber 2 of the electrochemical cell 1.

Chemical Reactions:

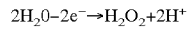
$$2H_2O-2e^-\to H_2O_2+2H^+$$

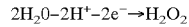
$$2H_2O-2H^+-2e^-\to H_2O_2$$

As a result, the anolyte increases its biocidal activity and decreases its corrosion activity (pH=7.2–7.6).

If the valve 12 is opened slightly and part of the catholyte is discharged, then the specific electric output for making anolyte is increased.

$$\frac{(I)}{Q_{total}}\ \text{catholyte} < \frac{(I)}{Q_{total}-Q_{catholyte}}\ \text{anolyte}$$

where:
I=current (A)
$Q_{total}$=flow through the device
$Q_{catholyte}$=catholyte output With reference to FIGS. 3 and 4, adding the catalyst chamber 13 makes it possible to neutralize a portion of the active ingredients in the catholyte and to increase the efficiency in the anode chamber 2, since part of the current, which was used earlier for the neutralization of active ingredients in the catholyte, assists in changing the characteristics of the anolyte. This allows one to increase the biocidal activity of the anolyte without measurably changing the pH.

The invention is illustrated by the following example, which is not intended to exhaust all of its possibilities.

Example. The cell contains titanium electrodes coated with platinum or platinum-iridium and a ceramic ultrafiltration diaphragm (see U.S. Pat. No. 5,427,667) was used for water treatment. The concentration of sodium chloride in the initial solution was 2 g/l. The power consumption was 1.8 KWHR/l.

The valve 12 was closed and the whole solution is run from the cathode chamber 3 into the anode chamber 2 together with the free hydrogen. The biocidal activity of the obtained anolyte was from 16 min. The corrosion activity of the obtained anolyte was 1.0 mm/year.

(Biocidal activity was determined by the time (minutes) required for disinfecting 1 liter of water containing bacteria of *E coli* group in concentrations of 1.107 after 1 ml of the anolyte, with the concentration of active chlorine 300 ppm added.)

The level of corrosion activity was determined by the velocity of the corrosion of metal samples (St. 3) using the weight method and was recalculated on the standard factor: a millimeter per annum).

Anolyte has the following parameters:
pH=8.5;
ORP=+780 mV comparatively to the chlorine-silver electrode.

When the valve 12 was opened and part of the catholyte (10% from the whole volume) was discharged, anolyte had the following parameters:
biocidal activity—13 minutes;
corrosion activity—1.9 mm/year;
pH=6.5;
ORP=+860 mV comparatively to the chlorine-silver electrode.

The catholyte (which can be used as a washing agent) was obtained with the following parameters: pH=11.0; ORP=−750 mV.

When using the catalytic carbon-manganese dioxide chamber on the special line, anolyte with the following characteristics was obtained:

| | Characteristics | |
|---|---|---|
| | without catholyte discharging | with 10% of the catholyte discharged |
| Biocidal activity | 14 min. | 12 min. |
| Corrosion activity | 1.8 mm/year | 3.1 mm/year |
| pH | 8.0 | 6.0 |
| ORP | +800 mV | +920 mV |

The above results can be compared to the characteristics of the anolyte and catholyte which can be obtained using the prototype apparatus disclosed in U.S. Pat. No. 5,427,667:

| | Characteristics | |
|---|---|---|
| | Anolyte | Catholyte |
| Biocidal activity | 12–20 min. | |
| Corrosion activity | 3.5–10 mm/year | |

-continued

| | Characteristics | |
|---|---|---|
| | Anolyte | Catholyte |
| pH | 3.8–6.0 | 9.5–12.0 |
| ORP | +780–+960 mV | −600—800 mV |

In accordance with the data presented herein, the invention allows one to obtain a bactericidal solution (anolyte) with wider functional abilities than in the prototype apparatus disclosed in U.S. Pat. No. 5,427,667. The present invention provides a possibility of fine regulation of the anolyte parameters during the process. The present invention also provides a possibility to increase a bactericidal activity of the anolyte and decrease its corrosion activity at the same time.

We claim:

1. An apparatus for obtaining washing and disinfecting solutions by means of electrolysis of a sodium chloride water solution, the apparatus comprising:

a) at least one electrochemical cell which contains vertical coaxial cylindrical and rod electrodes and a diaphragm, each of which are made from material which is non-soluble during electrolysis; each of the electrodes mounted in dielectric bushings and connected to the poles of a power supply;

b) the diaphragm comprising an ultrafiltration ceramic diaphragm made from a base material of zirconium oxide and installed between the electrodes; the diaphragm separating an inter-electrode space into a negative electrode chamber and a positive electrode chamber;

c) the dielectric bushings comprising a lower bushing and an upper bushing, each having a channel for the treated solution supply into and discharge from the electrode chambers; the channels being connected to a feeding line and a discharge line; and d) a feeding line connected to an inlet of the negative electrode chamber, the feeding line comprising a water line and a sodium chloride dosing line.

* * * * *